United States Patent
Kim et al.

(10) Patent No.: US 9,768,973 B2
(45) Date of Patent: Sep. 19, 2017

(54) APPARATUS AND METHOD FOR SUPPORTING USB MULTICASTING

(71) Applicant: Samsung Electronics Co., Ltd., Gyeonggi-do (KR)

(72) Inventors: Jun-Hyung Kim, Gyeonggi-do (KR); Jong-Hyo Lee, Gyeonggi-do (KR); Joo-Yeol Lee, Gyeonggi-do (KR); Ji-Hye Lee, Seoul (KR); Se-Hee Han, Seoul (KR)

(73) Assignee: Samsung Electronics Co., Ltd (KR)

( * ) Notice: Subject to any disclaimer, the term of this patent is extended or adjusted under 35 U.S.C. 154(b) by 41 days.

(21) Appl. No.: 14/437,730

(22) PCT Filed: Oct. 17, 2013

(86) PCT No.: PCT/KR2013/009292
§ 371 (c)(1),
(2) Date: Apr. 22, 2015

(87) PCT Pub. No.: WO2014/065538
PCT Pub. Date: May 1, 2014

(65) Prior Publication Data
US 2015/0304119 A1  Oct. 22, 2015

(30) Foreign Application Priority Data
Oct. 22, 2012 (KR) .......................... 10-2012-0117451

(51) Int. Cl.
*A47B 51/00* (2006.01)
*H04L 12/18* (2006.01)
*H04L 12/46* (2006.01)

(52) U.S. Cl.
CPC ........ *H04L 12/189* (2013.01); *H04L 12/1845* (2013.01); *H04L 12/4641* (2013.01)

(58) Field of Classification Search
CPC   H04L 12/1845; H04L 12/189; H04L 12/4641
See application file for complete search history.

(56) References Cited

U.S. PATENT DOCUMENTS

2004/0246909 A1   12/2004   Ahn
2005/0114489 A1   5/2005    Yonge et al.
(Continued)

FOREIGN PATENT DOCUMENTS

| KR | 1020040104242 | 12/2004 |
| KR | 1020060126518 | 12/2006 |
| KR | 1020070008587 | 1/2007  |

OTHER PUBLICATIONS

PCT/ISA/237 Written Opinion issued on PCT/KR2013/009292 (pp. 5).
PCT/ISA/210 Search Report issued on PCT/KR2013/009292 (pp. 5).

*Primary Examiner* — Kan Yuen
(74) *Attorney, Agent, or Firm* — The Farrell Law Firm, P.C.

(57) ABSTRACT

An apparatus and a method for quickly transmitting an identical file to all of the student terminals in a class are provided. A method for supporting multicasting in a host in a communication system that supports a wireless universal serial bus (USB) includes setting a connection with each device; determining whether a multicasting service is necessary; when the multicasting service is necessary, mapping a multicast end point (EP) to a unicast EP; and, when data is received, transmitting the data to the multicast EP.

6 Claims, 9 Drawing Sheets

(56) References Cited

U.S. PATENT DOCUMENTS

| | | |
|---|---|---|
| 2007/0189244 A1 | 8/2007 | de Prado Pavon et al. |
| 2011/0069652 A1 | 3/2011 | Kakani et al. |
| 2011/0158145 A1 | 6/2011 | Gong et al. |
| 2013/0282938 A1* | 10/2013 | Huang .................. G06F 13/385 710/106 |

* cited by examiner

APPARATUS AND METHOD FOR SUPPORTING USB MULTICASTING

PRIORITY

This application is a National Phase Entry of PCT International Application No. PCT/KR2013/009292, which was filed on Oct. 17, 2013, and claims priority to Korean Patent Application No, 10-2012-0117451, which was filed in the Korean Intellectual Property Office on Oct. 22, 2012, the entire content of each of which is incorporated herein by reference.

BACKGROUND OF THE INVENTION

1. Field of the Invention

The present invention generally relates to an apparatus and a method for supporting a Universal Serial Bus (USB) multicast.

2. Description of the Related Art

FIG. 1 illustrates an example in which a teacher lecture terminal distributes identical electronic class data to a plurality of student class terminals.

Peripheral devices connected to a host system may use a serial port, a parallel port, a Universal Serial Bus (USB) port, or the like as a communication channel through which data is transmitted and received.

The host system may be referred to as, for example, the teacher lecture terminal 100. The peripheral devices may be referred to as, for example, the student class terminals 110, 112, 114, 116 and 118.

As shown in FIG. 1, when the identical electronic class data is distributed from the teacher lecture terminal 100 to the plurality of student class terminals 110, 112, 114, 116, and 118 in a classroom, a total time for transmitting the electronic class data to all of the student class terminals 110, 112, 114, 116, and 118 is proportional to the number of the student class terminals. Because a USB port provides only a unicast, the teacher lecture terminal 100 should form a one-to-one connection with each of the student class terminals 110, 112, 114, 116, and 118, and sequentially and separately transmit the electronic class data.

Therefore, a method for quickly transmitting an identical file from the teacher lecture terminal 100 to all of the student class terminals 110, 112, 114, 116, and 118 is required.

FIG. 2 illustrates a layer structure diagram of a host and a device based on a WSB.

The WSB refers to a technique of wirelessly connecting a Universal Serial Bus (USB) host with a USB hub/USB device using a wireless (Wi-Fi) link. The WSB may recycle the existing mass storage supporting a USB device (a Mass Storage Class (MSC)) and a Multimedia Transfer Protocol (MTP).

In addition, the WSB is a simple protocol based on a non-Internet Protocol (IP), and is suitable for a simple file transmission performed in an independent classroom/meeting room.

Referring to FIG. 2, a host 200 includes a USB host layer 202, a host Protocol Adaptation Layer (PAL) 204, a Wi-Fi Media Access Control (MAC)/Physical (PHY) layer 206. The device 210 includes a USB device layer 212, a device PAL 214, a Wi-FI MAC/PHY layer 216. The host PAL 204 is an adaption for using the USB host layer 202 on the Wi-Fi MAC/PHY layer 206. The host PAL 204 changes a control signaling and data used in a USB host to a message or performs an inverse operation.

The USB host layer 202 and the USB device layer 212 transmit and receive USB data through an End Point (EP) 1 208 and an EP1 218. The EP1 218 of the USB device layer may be an identifier of a data tunnel used in a USB layer.

In addition, the host PAL 204 and the device PAL 214 performs a signaling through an EP a 209 and an EP a 219.

FIG. 3 illustrates a structure diagram of an existing host and devices.

Referring to FIG. 3, a host 300 transmits and receives USB data to and from a device 400 and a device 500 through a USB port.

At this time, a USB_EP_1 308-1 of the host 300 is mapped with a USB_EP_1 408-1 of the device 400, and a PAL_EP_1 309-1 of the host 300 is mapped with a PAL_EP_1 409-1 of the device 400.

In the same manner, a USB_EP_2 308-2 of the host 300 is mapped with a USB_EP_2 508-2 of the device 500, and a PAL_EP_2 309-2 of the host 300 is mapped with a PAL_EP_2 509-1 of the device 500.

Therefore, as described above, since the teacher lecture terminal 100 should form a one-to-one connection with each of the student class terminals 110, 112, 114, 116 and 118 and sequentially and separately transmit the electronic class data, a file transmission time is proportional to the number of the student class terminals.

SUMMARY OF THE INVENTION

The present invention has been made to address at least the above-mentioned problems and/or disadvantages and to provide at least the advantages described below.

Accordingly, an aspect of the present invention provides an apparatus and a method for quickly transmitting an identical file to all of the student class terminals.

According to an aspect of the present invention, a method of supporting a multicast in a host in a communication system that supports a wireless Universal Serial Bus (USB) comprises configuring a connection with each device, determining whether a multicast service is necessary, when the multicast service is necessary, mapping a multicast End Point (EP) with a unicast EP, and when streaming data is received, transmitting data to the multicast EP.

According to another aspect of the present invention, a method of supporting a multicast in a device in a communication system that supports a wireless Universal Serial Bus (USB) comprises configuring a connection with a host, determining whether a multicast service is necessary, when the multicast service is necessary, receiving a unicast End Point (hereinafter, EP) PAL EP and a multicast PAL EP, and when streaming data is received; transmitting data using a USB EP mapped with a multicast EP.

BRIEF DESCRIPTION OF THE DRAWINGS

The above and other aspects, features, and advantages of certain embodiments of the present invention will be more apparent from the following detailed description, taken in conjunction with the accompanying drawings, in which.

DETAILED DESCRIPTION OF EMBODIMENTS OF THE PRESENT INVENTION

Hereinafter, certain embodiments according to the present invention will be described in detail with reference to the accompanying drawings. In the description below, specific and particular contents are disclosed, but these are just provided to help a more overall understanding of the present invention, and it may be obvious that a predetermined change or modification of these specific contents may be performed within a scope of the present invention by a person having ordinary knowledge in this technical field.

The present invention can quickly transmit an identical file to all terminals.

The present invention can prevent the waste of a band and a time in which data is transmitted according to the number of terminals receiving identical data, and can transmit data to all terminals at once.

Figure 1:
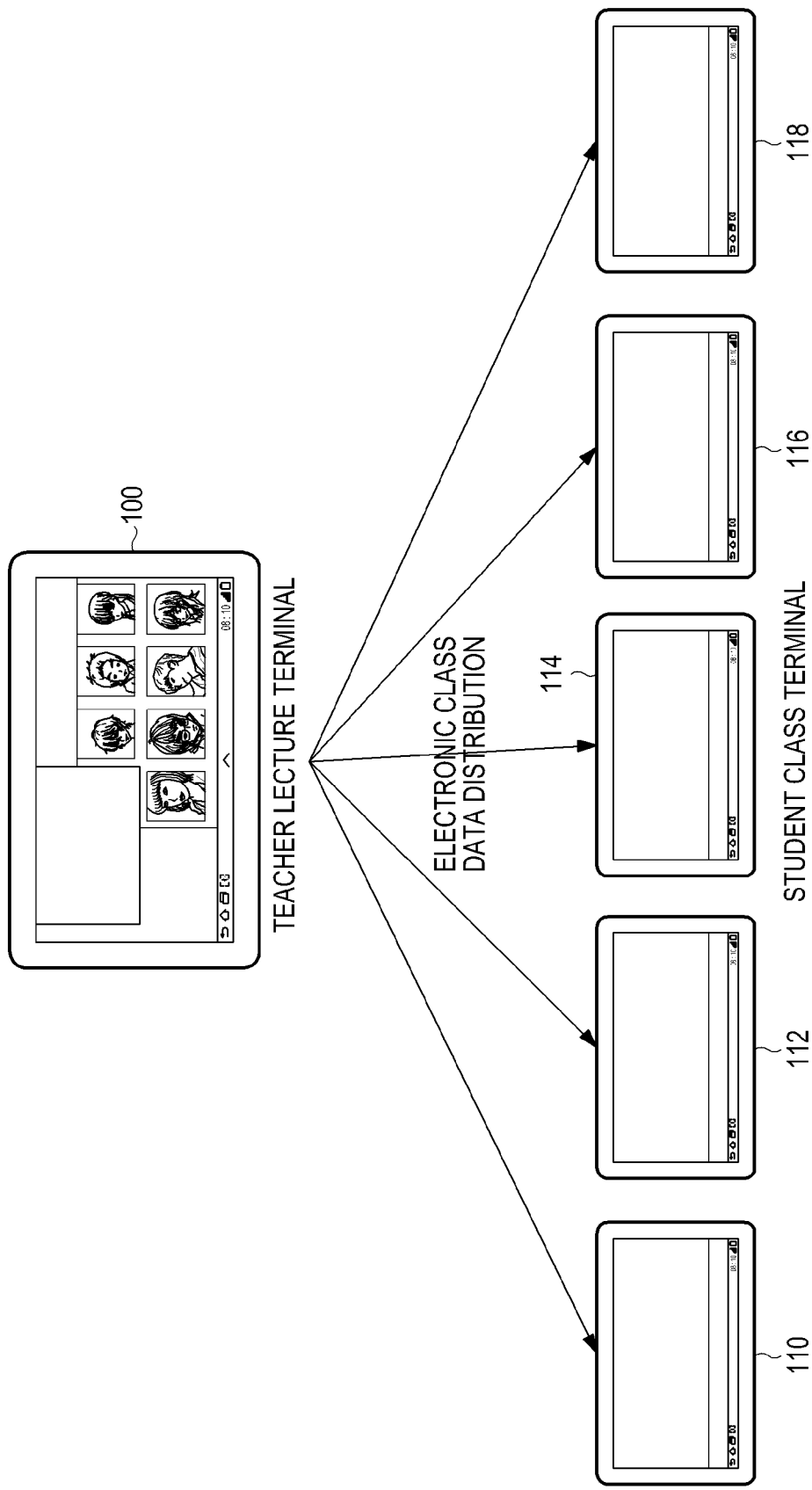
FIG. 1 is a configuration diagram illustrating an example in which a teacher lecture terminal distributes identical electronic class data to a plurality of student class terminals.
Figure 2:
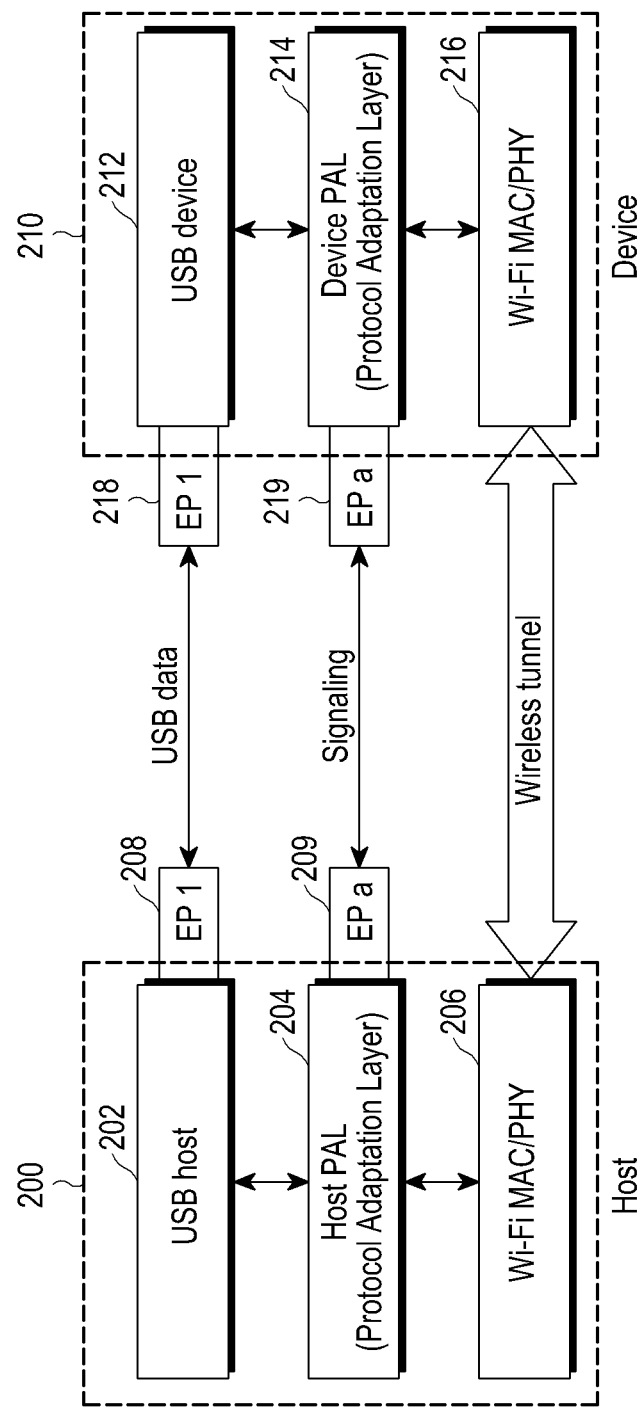
FIG. 2 is a layer structure diagram of a host and a device based on a WSB.
Figure 3:
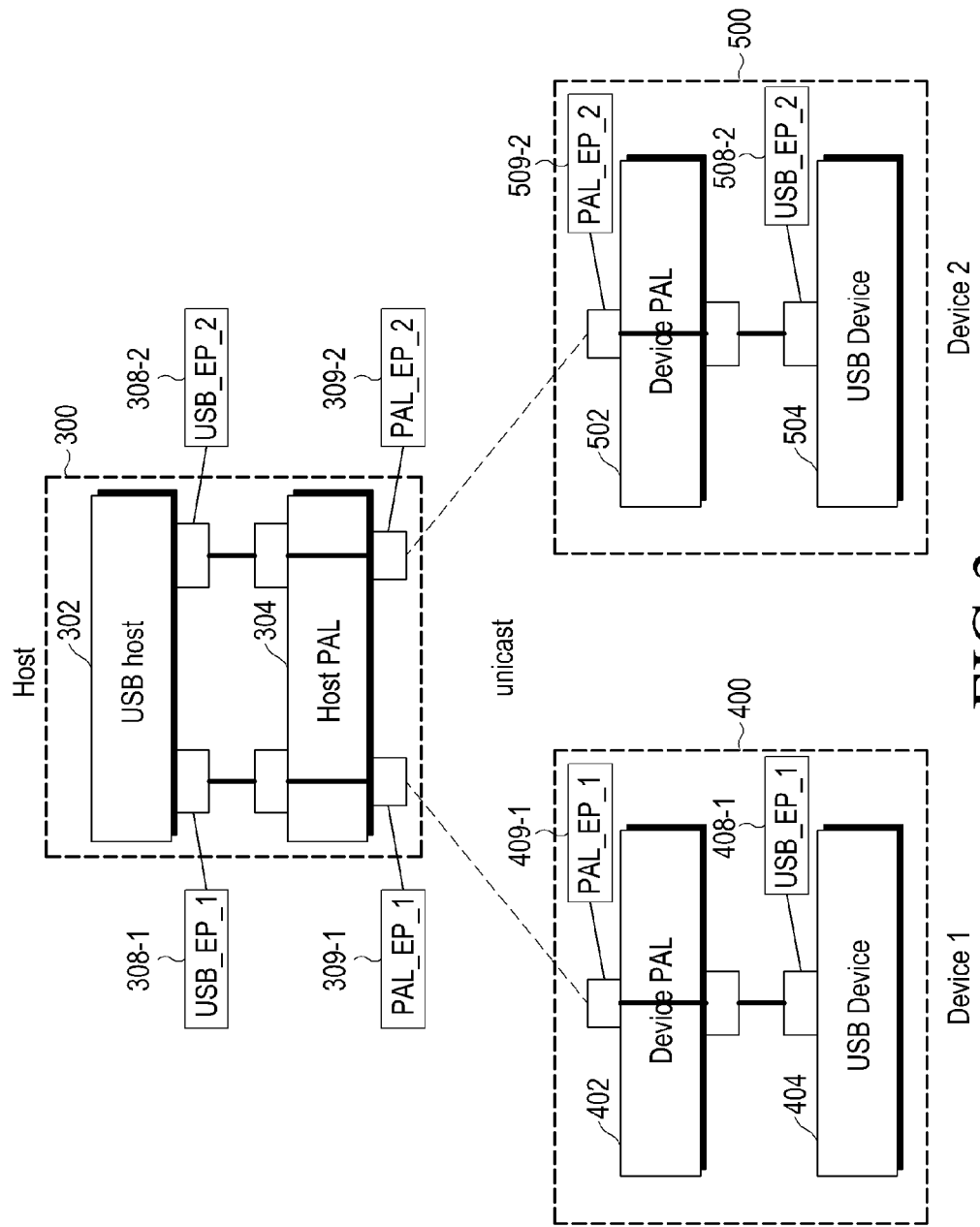
FIG. 3 is a structure diagram of an existing host and devices.
Figure 4:
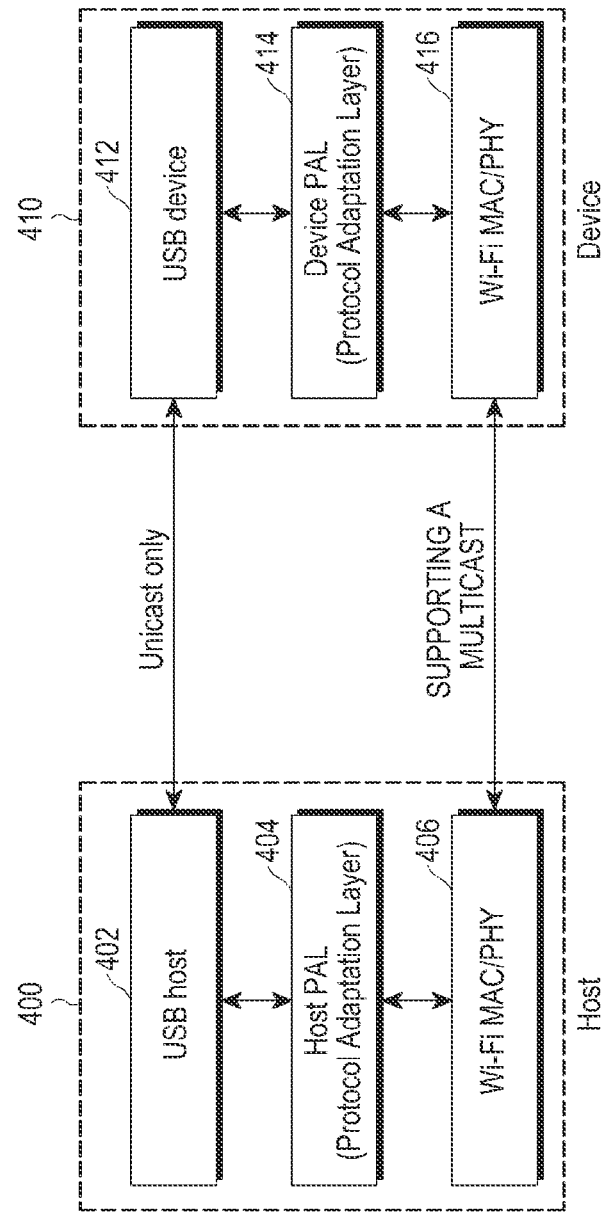
FIG. 4 is a structure diagram of a host and a device according to an embodiment of the present invention.

FIG. 4 illustrates a structure diagram of a host and a device according to an embodiment of the present invention.

A USB host layer 402 of a host 400 and a USB device 412 of a device 410 support only a unicast as shown in FIG. 4. In contrast, a Wi-Fi MAC/PHY layer 406 of the host 400 and a Wi-Fi MAC/PHY layer 416 of the device 410 support a multicast.

Therefore, in the present invention, a host PAL 404 and a device PAL 414 are utilized such that a multicast function of a Wi-Fi is utilized.

Figure 5:
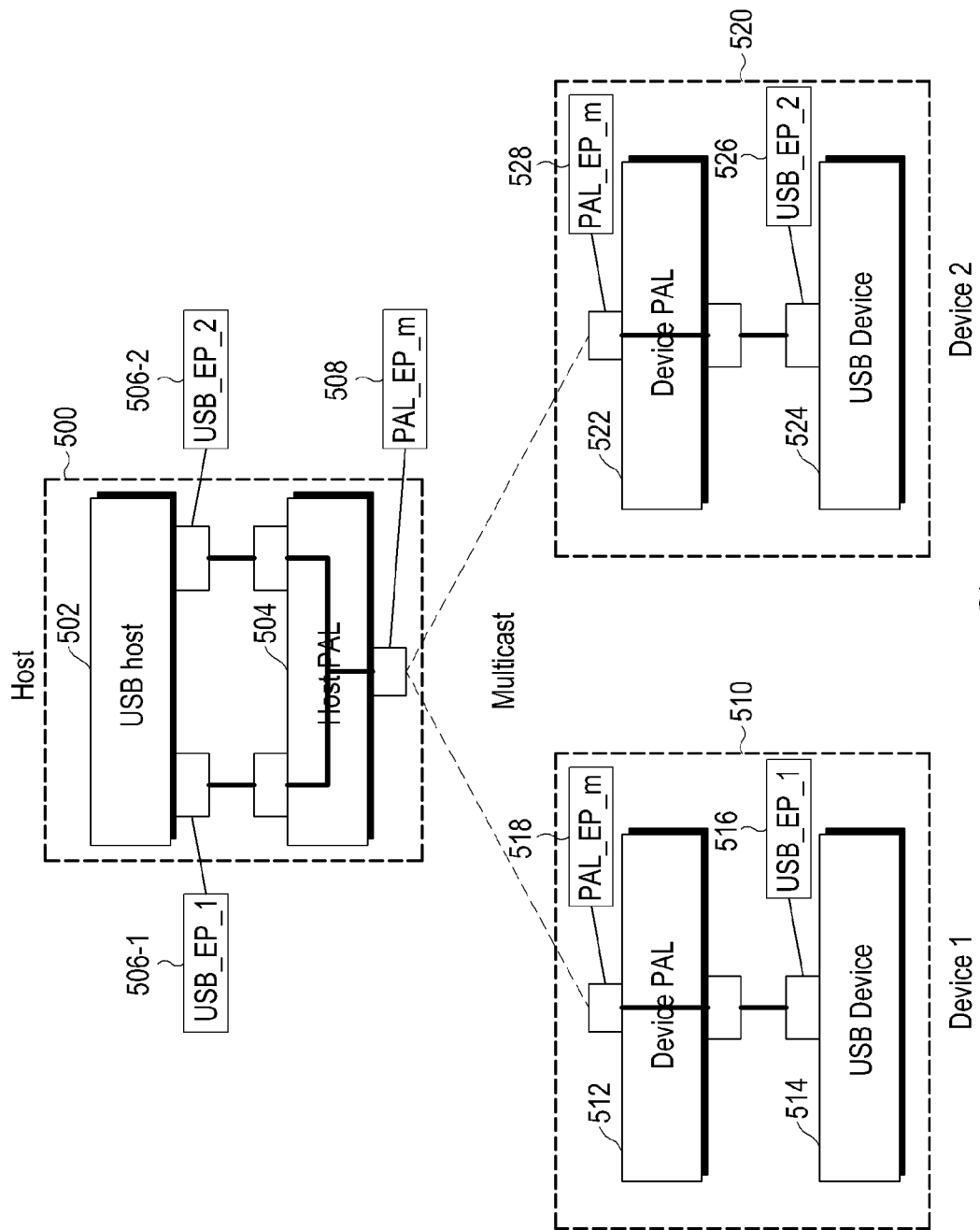
FIG. 5 is a structure diagram of a host and devices for supporting a multicast based on a WSB according to an embodiment of the present invention.

FIG. 5 illustrates a structure diagram of a host and devices for supporting a multicast based on a WSB according to an embodiment of the present invention.

In order to support a multicast transmission based on the WSB, a host PAL 504 of a host 500 allocates a virtual multicast address (PAL_EP_m) which groups each USB_EP (USB_EP_1 and USB_EP_2).

A USB host 502 of the host 500 transfers USB device EPs (USB_EP_1 and USB_EP_2) to the host PAL 504. The host PAL 504 binds the USB device EPs (USB_EP_1 and USB_EP_2) to one multicast EP (PAL_EP_m). The host PAL 504 multicasts data to a device 510 and a device 520 using the multicast EP (PAL_EP_m). Device PALs 512 and 522 may omit an ACK for the multicast data.

Figure 6:
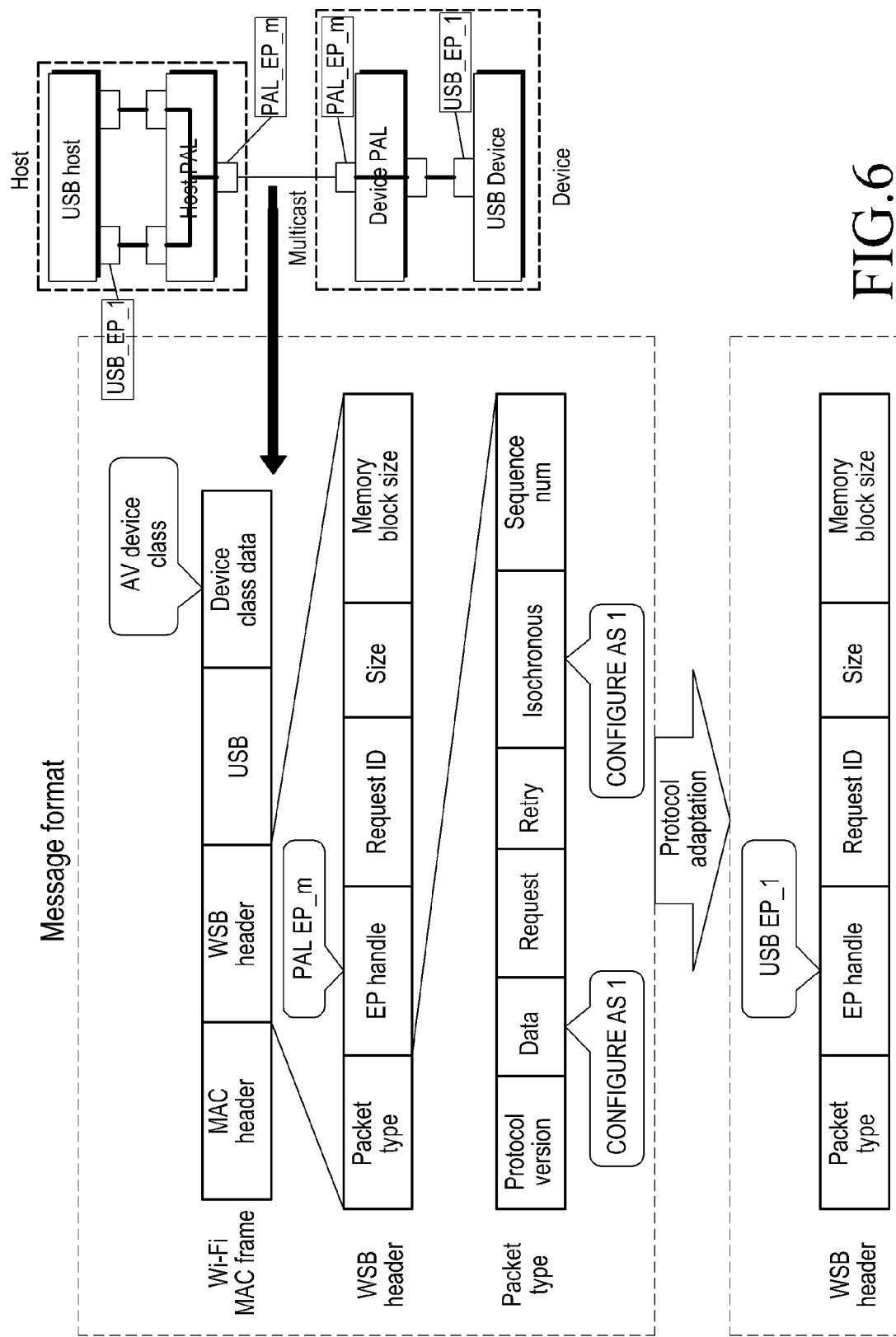
FIG. 6 is a structure diagram of a multicast message according to an embodiment of the present invention.

FIG. 6 is a structure diagram of a multicast message according to an embodiment of the present invention.

In order to multicast a multicast message including an allocated address to the device 510 and the device 520, a structure of the multicast message will be described.

Referring to FIG. 6, a device class may be identified from a descriptor of a device to which a USB host is connected with reference to a device class data field of a Wi-Fi MAC frame.

An EP handle field includes a virtual multicast address PAL EP_m, which groups each USB_EP in the host PAL.

Figure 7:
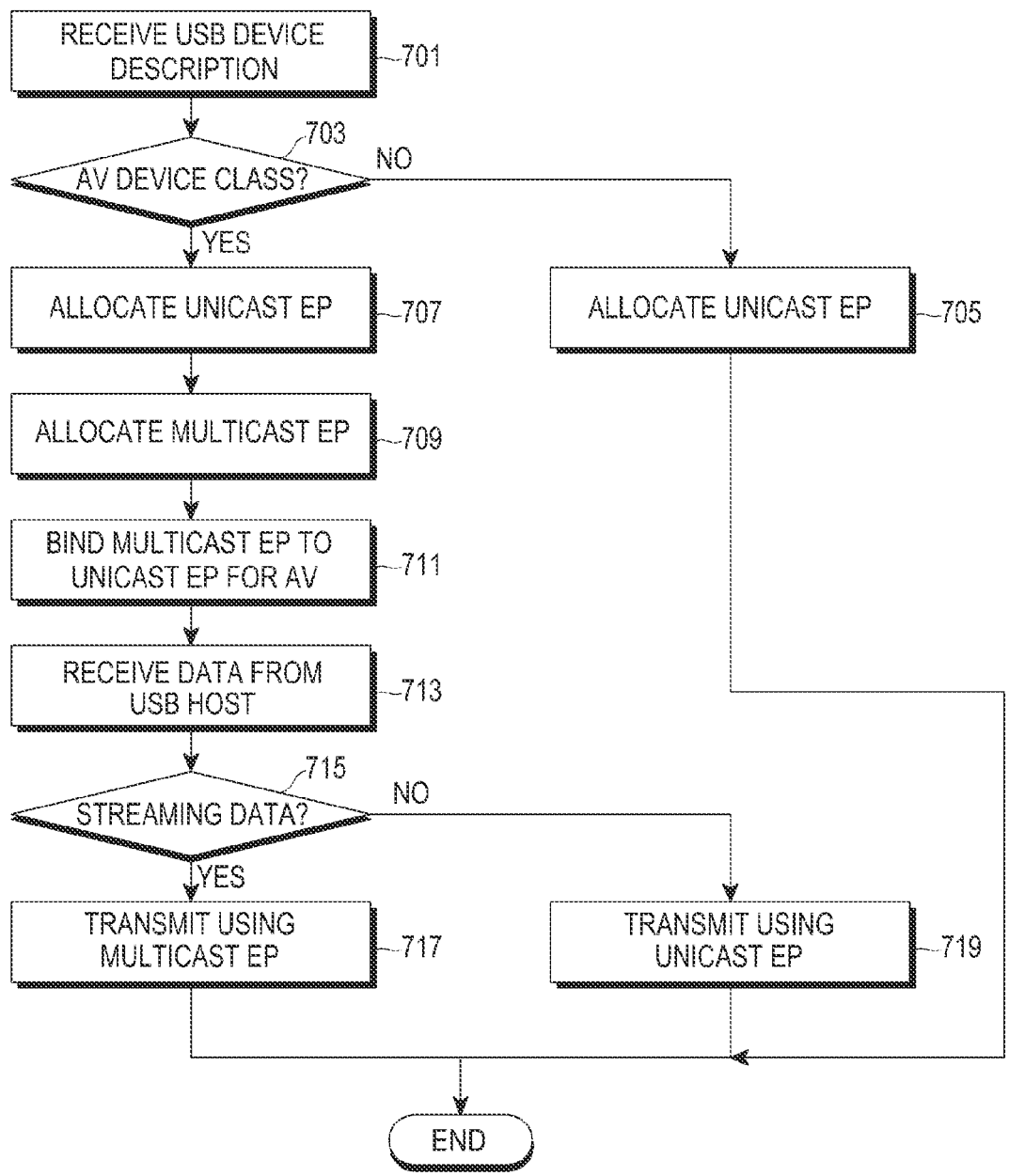
FIG. 7 illustrates a flowchart of a multicasting operation based on a WSB in a host PAL according to an embodiment of the present invention.

FIG. 7 illustrates a flowchart of a multicasting operation based on a WSB in a host PAL according to an embodiment of the present invention.

In step 701, a host PAL receives a USB device description from a device.

In step 703, the host PAL identifies an Audio/Video (AV) device class from the received description. That is, the host PAL determines whether a multicast service is necessary.

If, it is identified that the device is not the AV device class, in step 705, the host PAL allocates a unicast EP to the device. When the unicast EP is allocated, data is transferred through the allocated unicast EP without separate binding procedure.

If it is identified that the device is the AV device class, the host PAL firstly allocates the unicast EP to a control session (device setup and description) in step 707, and allocates a multicast EP for a multicast transmission in step 709.

In step 711, the host PAL binds (or maps) USB device EPs to one multicast EP. In step 713, the host PAL receives data from the USB host, and in step 715, the host PAL determines whether the data is streaming data.

When it is determined that the data is not the streaming data, in step 719, the host PAL transmits the data using the unicast EP.

When it is determined that the data is the streaming data, in step 717, the host PAL transmits the data using the multicast EP.

Figure 8:
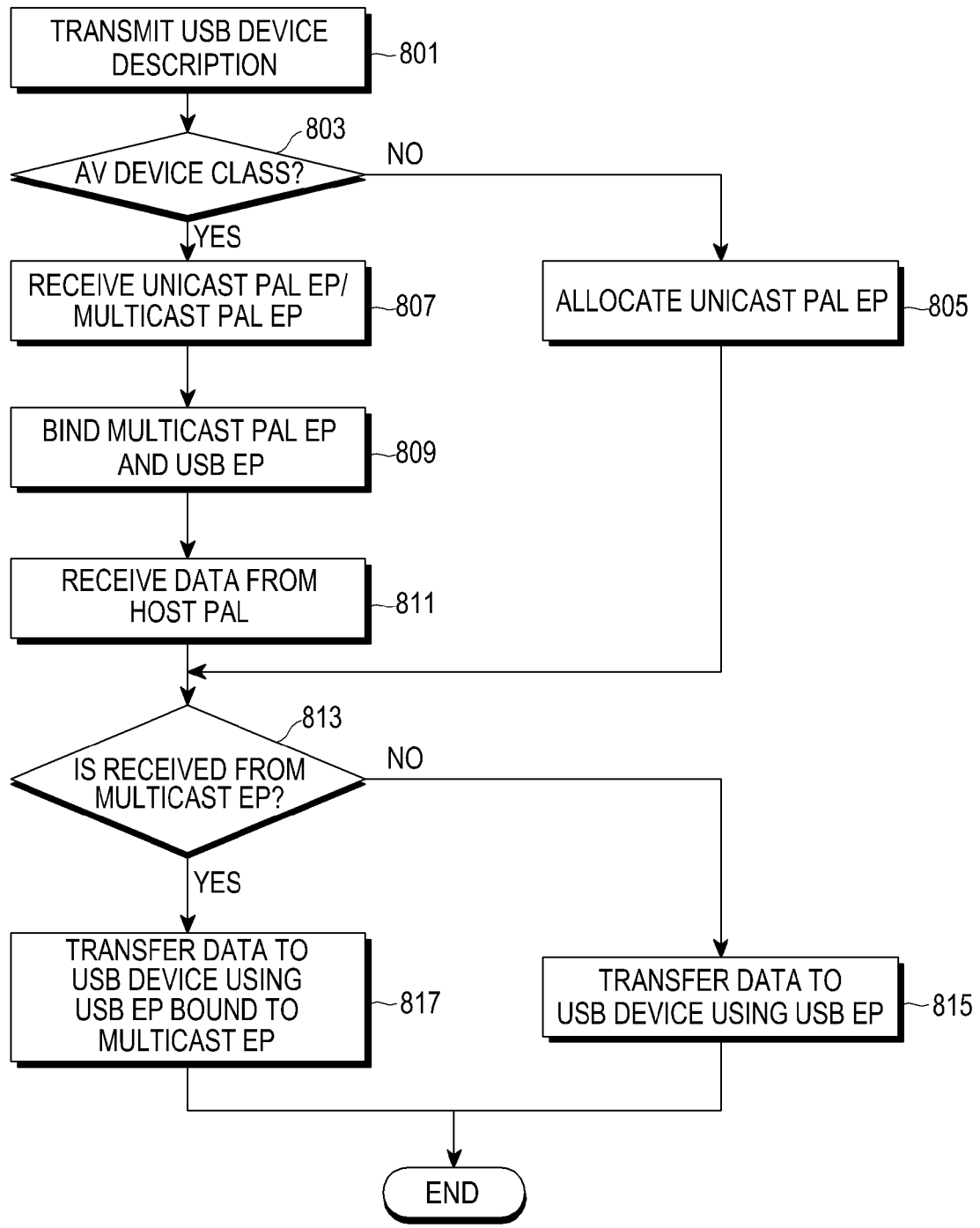
FIG. 8 illustrates a flowchart of a multicasting operation based on a WSB in a device PAL according to an embodiment of the present invention.

FIG. 8 illustrates a flowchart of a multicasting operation based on a WSB in a device PAL according to an embodiment of the present invention.

In step 801, a device PAL of a device transmits a USB device description to a host.

In step 803, the device PAL identifies an AV device class from the transmitted description. That is, the device PAL determines whether a multicast service is necessary.

If it is identified that the device is not the AV device class, in step 805, the device PAL allocates a unicast EP to the device. The device PAL then performs step 813.

If it is identified that the device is the AV device class, in step 807, the device PAL receives unicast PAL EP/multicast PAL EP.

In step 809, the device PAL binds the multicast PAL EP with a USB EP. In step 811, the device PAL receives data from a host PAL, and in step 813, the device PAL determines whether the data is received using the multicast EP.

When it is determined that the data is not received using the multicast EP, in step 815, the device PAL transfers the data to a USB device using the USB EP.

When it is determined that the data is received using the multicast EP, in step 817, the device PAL transfers the data to the USB device using the USB EP bound to the multicast EP.

Figure 9:
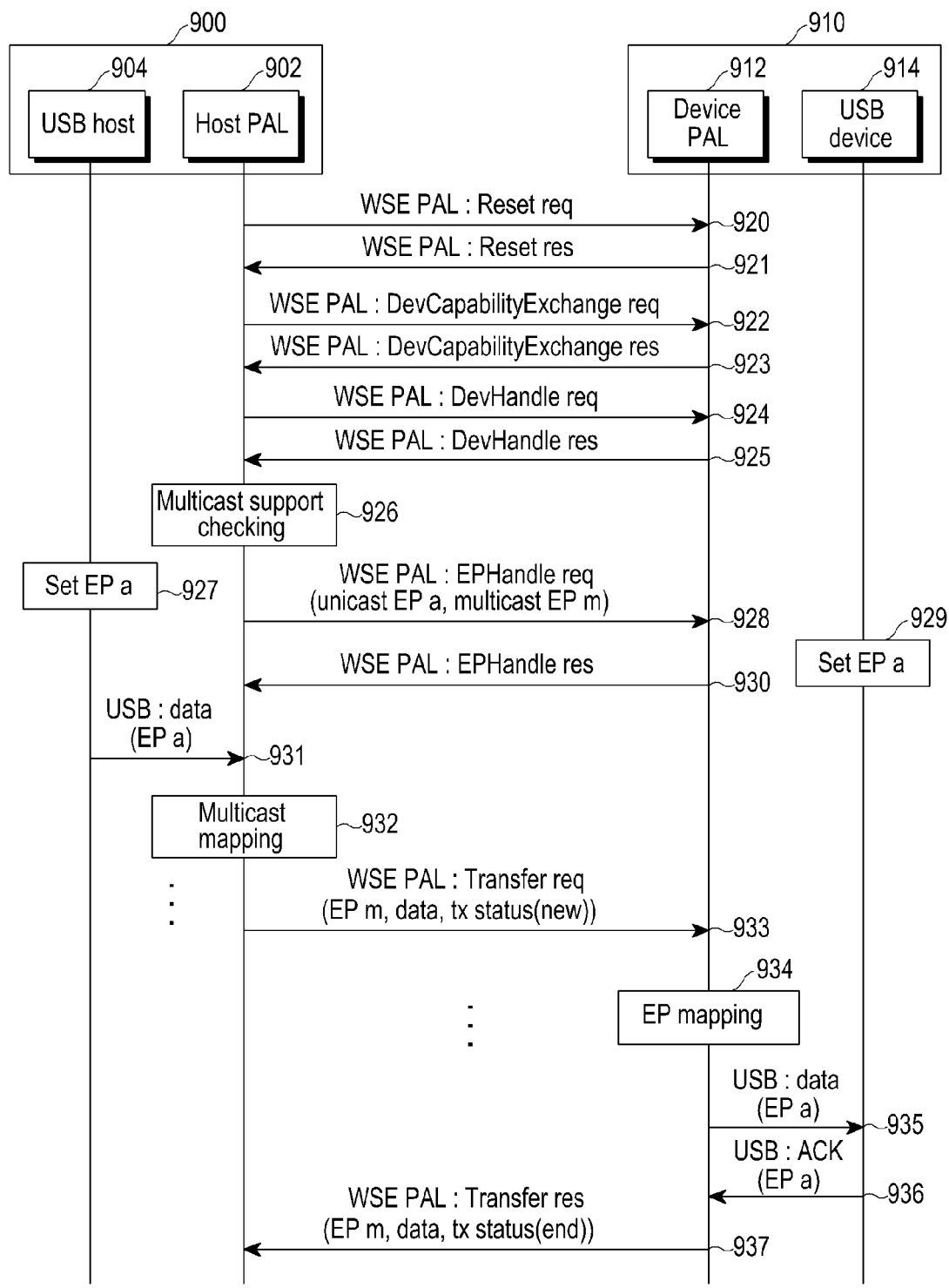
FIG. 9 illustrates a flowchart of a multicasting operation based on WSB between a host and a device according to an embodiment of the present invention.

FIG. 9 illustrates a flowchart of a multicasting operation based on WSB between a host and a device according to an embodiment of the present invention.

In step 920, a host PAL 902 transmits a reset request message to a device PAL 912.

In step 921, the device PAL 912 transmits a reset response message to the host PAL 902 in response to the reset request message.

In step 922, the host PAL 902 transmits a DeviceCapabilityExchange request message to the device PAL 912 to request a connection.

In step 923, the device PAL 912 transmits a DeviceCapabilityExchange response message to the host PAL 902 in response to the DeviceCapabilityExchange request message.

In step 924, the host PAL 902 transmits a DeviceHandle request message to the device PAL 912.

In step 925, the device PAL 912 transmits a DeviceHandle response message to the host PAL 902 in response to the DeviceHandle request message.

In step 926, the host PAL 902 identifies an AV device class from a received description. That is, the host PAL 902 determines whether a multicast service is necessary. At this time, in step 927, for example, a USB host 904 configures an EP of a USB device 914 as an EP a.

In step 928, the host PAL 902 transmits the EPHandle request message including a unicast EP a and a multicast EP m to the device PAL 912. The device PAL 912 binds the received unicast EP a and multicast EP m, and stores and manages the bound unicast EP a and multicast EP m.

In step 929, the USB device 914 configures, as the EP a, an EP allocated by the USB host 904.

In step 930, the device PAL 912 transmits the EPHandle response message to the host PAL 902 in response to the EPHandle request message. EPHandle of the USB device allocated through the EPHandle response message and a ResultCode for a success or failure of the allocation are transferred.

In step 931, the host PAL 902 receives data (configured as the EP a) from the USB host 904, and in step 932, the host PAL 902 maps the USB device EPs to one multicast EP.

At this time, the host PAL 902 has a memory, a list, and the like, which can store a mapping result.

In step 933, the host PAL 902 transmits a transfer request including the EP m, data, a transmission state (new), and the like to the device PAL 912.

In step 934, the device PAL 912 identifies the EP m of a received WSE PAL message and maps the EP m to the EP a resulting in the EP a bound to the EP m.

In step 935, the device PAL 912 transmits the data to the USB device 914 using the EP a. In step 936, the USB device 914 transmits an ACK message to the device PAL 912 using the EP a. The device PAL 912 may omit an ACK for the multicast data.

In step 937, the device PAL 912 transmits a transfer response message including the EP m, the data, a transmission data (end), and the like to the host PAL 902 in response to the transfer request message. In FIG. 9, the WiGig Serial Extension (WSE) defines a WSE host communicating with a WSE device over a WiGig wireless link interface. The WSE host can connect and control several WSE devices.

Although the present invention is described by certain embodiments and drawings, however, the present invention is not limited thereto, and it is certain that the present invention may be changed or modified by a person having an ordinary skill in the technical field in which the present invention is included. It will be evident that various modifications and changes may be made to these embodiments without departing from the spirit and scope of the present invention as defined by the appended claims and their equivalents

The invention claimed is:

1. A method of supporting a multicast by a host in a communication system that supports a wireless universal serial bus (USB), the method comprising:
    determining whether a multicast service is necessary based on device information;
    when it is determined that the multicast service is necessary, binding a plurality of addresses corresponding to a plurality of unicast points to an address corresponding to a multicast point; and
    transmitting data to a plurality of devices based on the address corresponding to the multicast point,
    wherein the address corresponding to the multicast point is a virtual multicast address binding the plurality of the addresses.

2. The method as claimed in claim 1, wherein binding the plurality of addresses corresponding the plurality of the unicast points to the address corresponding to the multicast point comprises binding a plurality of addresses corresponding to a plurality of USB end points (EPs) to an address corresponding to a multicast protocol adaptation layer (PAL) EP in a PAL.

3. The method as claimed in claim 1, wherein the device information comprises a device description indicating a device class.

4. An apparatus of supporting a multicast by a host in a communication system that supports a wireless universal serial bus (USB), the apparatus comprising:
    a transceiver configured to transmit or receive data; and
    a controller configured to
        determine whether a multicast service is necessary based on device information,
        when it is determined that the multicast service is necessary, bind a plurality of addresses corresponding to a plurality of unicast points to an address corresponding to a multicast point, and
        transmit data to a plurality of devices based on the address corresponding to the multicast point,
        wherein the address corresponding to the multicast point is a virtual multicast address binding the plurality of the addresses.

5. The apparatus as claimed in claim 4, wherein the controller is further configured to bind a plurality of addresses corresponding to a plurality of USB end points (EPs) to an address corresponding to a multicast protocol adaptation layer (PAL) EP in a PAL.

6. The apparatus as claimed in claim 4, wherein the device information comprises a device description indicating a device class.

* * * * *